United States Patent

[11] 3,599,518

| [72] | Inventor | Walter J. Goettsch<br>Kenilworth, Ill. |
|---|---|---|
| [21] | Appl. No. | 877,356 |
| [22] | Filed | Nov. 17, 1969 |
| [45] | Patented | Aug. 17, 1971 |
| [73] | Assignee | Harris-Intertype Corporation<br>Cleveland, Ohio<br>Continuation-in-part of application Ser. No. 706,179, Feb. 16, 1968, now Patent No. 3,508,460. |

[54] PAPERBOARD CUTTING APPARATUS AND METHOD
9 Claims, 4 Drawing Figs.

[52] U.S. Cl. .................................................... 83/13,
83/56, 83/168, 83/169, 83/429, 83/470, 83/474, 83/552, 83/659
[51] Int. Cl. .................................................... B26d 1/22
[50] Field of Search .......................................... 83/13, 56, 347, 659, 658, 168, 169, 470, 552, 474, 429

[56] References Cited
UNITED STATES PATENTS

| 3,424,043 | 1/1969 | Martin........................ | 83/659 X |
|---|---|---|---|
| 1,677,915 | 7/1928 | Crane......................... | 83/408 |

FOREIGN PATENTS

| 700 | 1/1884 | Great Britain............... | 83/347 |

*Primary Examiner*—Frank T. Yost
*Attorney*—Seidel, Gonda & Goldhammer

ABSTRACT: Corrugated paperboard is cut or slit by rotating circular blades having a serrated edge while the paperboard is supported by a full face rotating brush roll juxtaposed to said circular blades. Nozzle means are provided for discharging a mist on the circular blades to clean the same during operation. A support plate is provided adjacent the nip on the feed-in side to prevent the paperboard from drooping and thereby assure a good clean cut.

INVENTOR
WALTER J. GOETSCH
BY
Seidel, Gonda & Goldhammer
ATTORNEYS

PAPERBOARD CUTTING APPARATUS AND METHOD

This application is a continuation-in-part of my copending application Ser. No. 706,179 filed Feb. 16, 1968, now U.S. Pat. No. 3,508,460.

In the manufacture of corrugated paperboard, it is conventional to make wide board and then longitudinally slit the paperboard into webs of the desired widths. In a subsequent operation, the webs are cut to unit lengths by a cutoff knife. Heretofore, slitting has been accomplished by means of a rotating circular blade on one shaft, and a mating die or circular blade on a parallel shaft. It is mandatory that the blades run dead true and that their opposed edges be in juxtaposition to insure a good cut. Because of the need to have opposing edges of the blades in contact, the pressure between them may vary so that nicking and premature wear of the cutting edge is common.

In accordance with the present invention, the paperboard is cut by a rotating circular blade having a serrated edge while the paperboard is supported by a full face rotatable brush roll. Thus, the present invention contemplates slitting or cutting paperboard while using only one circular blade without any mating die, blade, or anvil. By using a full face brush instead of a mating die, blade or anvil to support the corrugated paperboard and cooperate with the upper blade, various disadvantages of the prior art are overcome.

The slitting or cutting attained by the present invention is consistently of superior quality in that the slit edge is square, clean, and without crushed or damaged edges such as "crow's feet." This superior quality is especially pronounced when slitting double-wall and triple-wall corrugated paperboard. The edges are not crushed or damaged since they are not fed between a circular blade and a mating die or anvil wherein the corrugated paperboard structure is crushed and the edges of the outer liners generally intermittently torn before the shearing function of the slitter is accomplished.

The present invention avoids prior problems resulting in a loose edge caused by disturbing the adhesive bond between the liners and the corrugated member when running with stiff liners or on multiple structure such as double wall or triple wall at speeds approaching the bonding capacity of a doublefacer. The amount of dust, commonly referred to as "fuzz" produced by the slitting operation of the present invention is minimal.

Heretofore, it was conventional to use a slitting circular blade and a mating die or anvil, each of which is adjustable along its respective shaft. Each time the width of the board to be slit was changed, the location of the circular blade and anvil or die had to be correspondingly changed. Because the present invention utilizes only a single cutting member and only this member is moved when changing the setup, labor and setup time are greatly reduced and only nominal skill is required. The previous method of setting two circular blades in juxtaposition required excessive precision in manufacture of the components and in setting them on their respective shafts to cut properly. If runout occurred the resulting interference induced critical loads on components of the driving mechanism and waste of applied power.

It is an object of the present invention to provide novel apparatus and method for slitting or cutting corrugated paperboard.

It is another object of the present invention to provide novel apparatus and method for slitting or cutting corrugated paperboard which produces a cut of superior quality while at the same time substantially reduces setup time.

It is another object of the present invention to provide slitting or cutting structure which is easier to automate.

It is another object of the present invention to provide novel apparatus and method for slitting or cutting corrugated paperboard which does not use an anvil or die.

It is another object of the present invention to provide novel apparatus and method for slitting or cutting corrugated paperboard utilizing a self-cleaning serrated blade and rotatable brush roll.

It is another object of the present invention to provide novel apparatus and method for slitting or cutting corrugated paperboard which does not crush the edge of the board where the cut is being made and eliminates the tendency of the liners to tear, commonly called "crow's-feet."

Other objects will appear hereinafter.

For the purpose of illustrating the invention, there are shown in the drawings forms which are presently preferred; it being understood, however, that this invention is not limited to the precise arrangements and instrumentalities shown.

Figure 1:
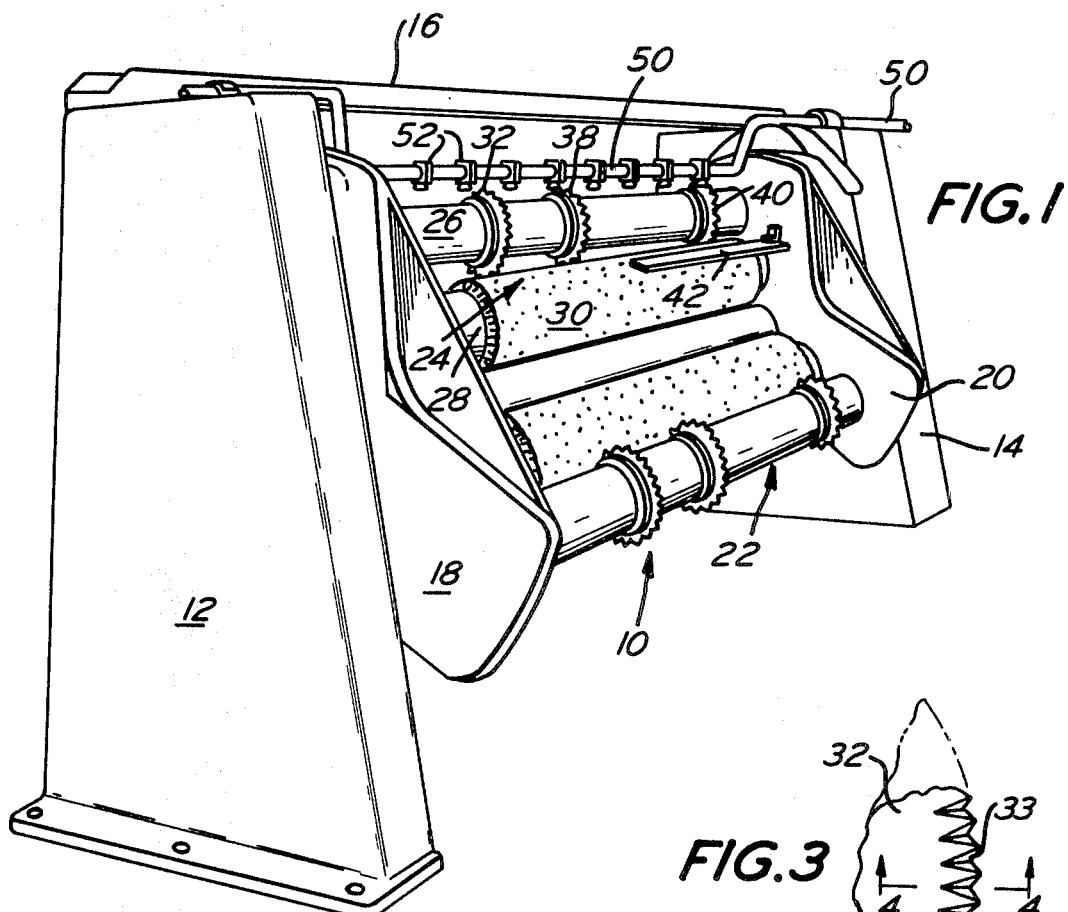
FIG. 1 is a perspective view of a slitter in accordance with the present invention.
Figure 3:
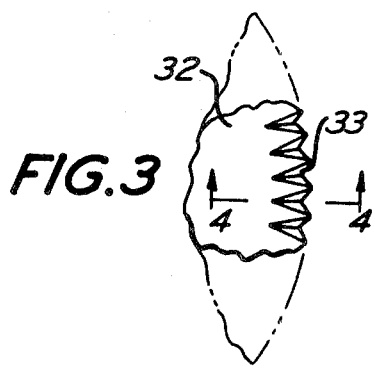
FIG. 3 is a partial plan view of a slitting blade.

Referring to the drawing in detail, wherein like numerals indicate like elements, there is shown in FIG. 1 a paperboard slitter designated generally as 10. The slitter 10 includes end frames 12 and 14 interconnected by a brace 16. The end frames 12 and 14 support one or more slitting stations.

As illustrated, the slitter 10 includes a rotary unit 18—20 having three slitting stations. Only slitting stations 22 and 24 are illustrated. The principles of the present invention are adapted for use in a slitter having single or multiple slitting stations. Hence, the illustration of a slitter having triple slitting stations, only one of which is in operative position, is for purposes of illustration only.

The operative slitting station, namely station 24, includes parallel rotatable shafts 26 and 28. A plurality of slitting units having blades 32, 38 and 40, are supported by shaft 26 and rotate therewith. When station 24 is in an inoperative position, the slitting units may be moved to any desired position along shaft 26. The number of slitting units on shaft 26 is determined by the number of cuts to be made in the paperboard. For the purposes of the present disclosure, it is assumed that the board is to be trimmed along its longitudinal edges and slit longitudinally by blades 32 and 38 into two separate webs.

Figure 2:
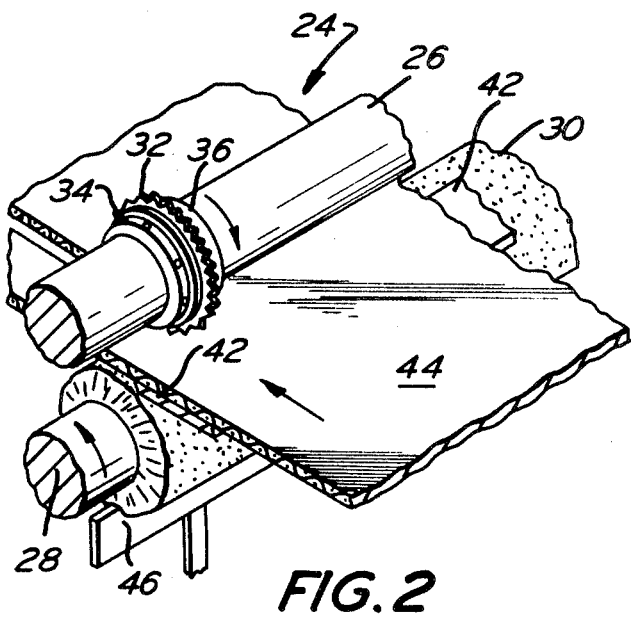
FIG. 2 is a partial perspective view on an enlarged scale of the rotating blade and mating full face brush in accordance with the present invention.

Each of the slitting units is identical. As shown more clearly in FIG. 2, the slitting unit comprises a pair of conventional collars or hubs 34 and 36 adapted to be removable secured to the shaft 26 at spaced points therealong by use of screws or bolts. The blade 32 is fixedly secured to the hubs 34 and 36.

In accordance with the present invention, the cutting blade 32 is provided with a serrated edge. The blades which have given excellent performance had a diameter of 9 inches, were 0.032 inches thick, had a single bevel, and were made from 440-A stainless steel with approximately one-half inch of the periphery coated with a hard material such as tungsten carbide so as to have a hardness of Rockwell-C 51—54. The coating is harder than the remainder of the blades Shaft 26 and blade 32 are rotated so that blade 32 has a surface speed between 200 percent and 360 percent of the speed of the web of corrugated paperboard 44.

A brush roll 30 is fixedly secured to shaft 28 and extends across the full width of adjustment of the blades 32, 38, and 40 on the shaft 26. Brush roll 30 is preferably made of short stiff nylon bristles having a length of about five-eighths of an inch to 2 inches. A uniform bristle length of three-fourths of an inch is preferred. The bristles preferably have a diameter of about 0.015 to 0.020 inches so as to be sufficiently stiff to support the web of paperboard 44 with only nominal deflection. A bristle diameter of 0.018 inches is preferred. Such flexure of the bristles is desired since contaminants such as fuzz imparted to the brush are automatically deflected as the brush roll rotates thereby making the brush roll 30 self-cleaning.

Brush roll 30 is rotated so as to have a surface speed of approximately 103 percent of the speed of the corrugated web of paperboard 44. If desired, a doctor bar 46 may be provided which flexes the bristles on the brush roll 30 to eliminate any tendency for the formation of grooves in the brush roll where the blade 32 enters the same and to flick out any accumulated dust. A stationary plate 42 extends across the full width of each section and supports the paperboard 44 adjacent the nip between the blades and the periphery of the brush roll 30 on the feed-in side.

Figure 4:
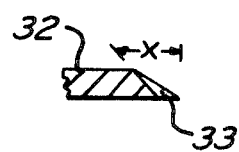
FIG. 4 is a sectional view taken along line 4—4 in FIG. 3.

I have found that the optimum size and shape for the serrations 33 of the blades are as follows:

The serrations are approximately one-eighth inch long in radial length with the shape of the serration being V-shaped. The cutting edge of the teeth is at one side face of the blade as shown in FIG. 4. The blade has 9 to 12 serrations per inch. The serrations are on said tungsten carbide coating and are easier to machine and sharpen since they are a single bevel. The serrated edge on the blades is an interrupted edge as opposed to a continuous edge. A blade edge which is interrupted operates with a smaller downward pressure and gives a clean square cut in the paperboard.

The depth which the blade penetrates the periphery of the brush roll 30 may be varied as desired. Good results have been attained where the penetrations is one-eighth to three-sixteenth of an inch. Not withstanding the penetration of the blade in the brush 30, no evidence of bristle attrition was noted. Nip pressure is minimal when the angle between the paperboard and the side face of the serrations is between 45° and 70° as indicated by the angle $x$ in FIG. 4.

As used herein, a brush roll is a roll having solid or hollow core with generally radial bristles on its outer periphery. A "-full face" brush roll is one wherein the core has bristles along its entire operative length. The operative length of the roll 30 is generally equal to or slightly wider than the maximum width paperboard 44 which can be processed by the machine 10. The present invention may be used where the slitting blades are driven by separate laterally adjustable motors rather than by a motor connected to a common shaft for all of the blades as described above.

A stationary conduit 50 extends across the top of the frames 12 and 14. One end of conduit 50 is connected to a conventional steam supply line commonly available in the manufacture of corrugated board. The other end of conduit 50 is closed but provided with a drain to facilitate removal of condensate. Conduit 50 is provided with a plurality of nozzles at spaced points therealong which discharge a mist of steam downwardly on the circular blades 32, 38 and 40 of section 24. The mist, by moistening the blades prevents the accumulation of and drying of adhesive and dust thereon, as they revolve, so as to prevent the serrations from becoming clogged and reducing the cutting effectiveness. A sufficient number of nozzles 52 are provided so that the circular blades will be subject to the environment of the mist at all positions of the blades along shaft 26. The inlet end of conduit 50 may also be connected to an oil or other fluid mist generator in like manner so as to discharge an oil mist downwardly from the nozzles on the circular blades 32, 38 and 40 of section 24. Such oil mist serves the same function as the steam mist and, with certain types of adhesives, may be more effective. Hence, the mist may be a variety of gases such as steam, oil, ethylene glycol, etc.

The present invention may be embodied in other specific forms without departing from the spirit or essential attributes thereof, and accordingly, reference should be made to the appended claims, rather than to the foregoing specification as indicating the scope of the invention.

I claim:

1. A method of slitting corrugated paperboard comprising the steps of slitting the paperboard using a plurality of rotating circular blades having a serrated edge while supporting the paperboard by a rotating brush roll juxtaposed to said blades, rotating the brush roll at a speed slightly greater than the speed of the movement of the paperboard and rotating the blade at a yet higher speed, using a brush roll whose bristles are stiff and have an interference fit with the cutting edge on said blades, and supporting the paperboard adjacent the nip of the brush roll and blades by a plate on the feed-in side.

2. A method in accordance with claim 1 including discharging a mist onto the blades while the blades slit the paperboard.

3. A method in accordance with claim 2 wherein said mist is a gas.

4. A method in accordance with claim 2 wherein said mist includes liquid particles.

5. Apparatus comprising a frame supporting a rotatable shaft, a plurality of circular blades supported by said shaft at spaced points therealong, a brush roll supported for rotation about an axis parallel to the axis of rotation of said shaft, and the cutting edges of each blade being juxtaposed to a portion of said brush roll, said brush roll having bristles along its entire operative length, said brush roll having stiff bristles positioned so as to have an interference fit with the cutting edge on said blades, so that corrugated paperboard may be cut as it passes between the brush roll and blades, and a plate for supporting the paperboard adjacent the nip between said brush roll and the blades on the feed-in side.

6. Apparatus in accordance with claim 5 including a hard coating at the periphery of the blades which is harder than the remainder of the blades, said coating containing single-bevel serrations defining the cutting of the blades.

7. Apparatus in accordance with claim 5 including nozzle means adjacent the periphery of said blades for discharging a mist at the periphery of said blades.

8. Apparatus in accordance with claim 7 including on said frame a second shaft, a second brush roll, said second shaft containing a plurality of circular cutting blades, said second shaft and said brush roll being inoperative and movable to a position occupied by said first-mentioned shaft and brush roll so that said nozzle means may discharge mist at the periphery of the blades on the second shaft.

9. Apparatus comprising a frame, a rotatable shaft, means supporting said shaft on said frame for rotation about the axis of the shaft, a plurality of circular blades supported by said shaft at spaced points therealong, a brush roll supported for rotation about an axis parallel to the axis of rotation of said shaft, the cutting edges of each blade being juxtaposed to a portion of the periphery of said brush roll, said brush roll having bristles along its entire operative length, said bristles being stiff and positioned so as to have an interference fit with the peripheral cutting edge on said blade so that corrugated paperboard may be cut as it passes between the periphery of the roll and the blade, a plate for supporting the paperboard adjacent the nip between said brush roll and the blades on the feed-in side, means for rotating the brush roll at a speed slightly greater than the speed of paperboard to be cut, and means for rotating said blades at a speed higher than the speed of said brush roll.